(12) United States Patent
Chung (10) Patent No.: US 12,056,269 B2
(45) Date of Patent: Aug. 6, 2024

(54) CONTROL DEVICE AND CONTROL METHOD

(71) Applicant: HTC Corporation, Taoyuan (TW)

(72) Inventor: Wei-Jen Chung, Taoyuan (TW)

(73) Assignee: HTC Corporation, Taoyuan (TW)

( * ) Notice: Subject to any disclaimer, the term of this patent is extended or adjusted under 35 U.S.C. 154(b) by 3 days.

(21) Appl. No.: 18/087,823

(22) Filed: Dec. 23, 2022

(65) Prior Publication Data

US 2024/0211025 A1    Jun. 27, 2024

(51) Int. Cl.
*G06F 3/01*     (2006.01)
*G06T 7/70*     (2017.01)
*G06T 19/00*    (2011.01)

(52) U.S. Cl.
CPC ............ *G06F 3/011* (2013.01); *G06F 3/017* (2013.01); *G06T 7/70* (2017.01); *G06T 19/00* (2013.01); *G06T 2207/30196* (2013.01); *G06T 2210/21* (2013.01)

(58) Field of Classification Search
CPC . G06F 3/011; G06F 3/017; G06T 7/70; G06T 19/00; G06T 2207/30196; G06T 2210/21
See application file for complete search history.

(56) References Cited

U.S. PATENT DOCUMENTS

| | | | |
|---|---|---|---|
| 10,403,047 B1 * | 9/2019 | Comer | G06F 3/011 |
| 10,747,336 B1 | 8/2020 | Pham et al. | |
| 2010/0156941 A1 * | 6/2010 | Seung | H04N 23/62 348/E5.022 |
| 2010/0241998 A1 * | 9/2010 | Latta | G06F 3/011 715/862 |
| 2011/0037712 A1 * | 2/2011 | Kim | G06F 3/0488 345/173 |
| 2012/0019858 A1 * | 1/2012 | Sato | H04N 1/00344 358/1.15 |
| 2013/0093788 A1 * | 4/2013 | Liu | G01C 21/365 345/633 |
| 2017/0243512 A1 * | 8/2017 | Lee | G09B 5/02 |

(Continued)

FOREIGN PATENT DOCUMENTS

| | | |
|---|---|---|
| CN | 102760308 | 10/2012 |
| CN | 111309142 | 6/2020 |

(Continued)

OTHER PUBLICATIONS

"Office Action of Taiwan Counterpart Application", issued on Nov. 24, 2023, p. 1-p. 7.

(Continued)

*Primary Examiner* — Christopher E Leiby
(74) *Attorney, Agent, or Firm* — JCIPRNET (57) ABSTRACT

A control device is provided. The control device is adapted to control an object in a virtual world. The control device includes a display and a controller. The display is configured to display the virtual world. The controller is coupled to the display. The controller is configured to perform the following functions. In the virtual world, a control surface is formed around a user. A first ray is emitted from the object. Based on the first ray, a first control point is formed on the control surface. According to the first control point, a first control is performed on the object.

18 Claims, 8 Drawing Sheets

(56) References Cited

U.S. PATENT DOCUMENTS

| | | | | |
|---|---|---|---|---|
| 2018/0005443 A1* | 1/2018 | Poulos | ............... | G06F 3/017 |
| 2018/0210542 A1* | 7/2018 | Mclean | ............... | G06F 3/011 |
| 2020/0097065 A1* | 3/2020 | Lyer | ............... | G06F 3/017 |
| 2022/0270509 A1* | 8/2022 | Josephson | ............... | G06T 19/00 |
| 2023/0040737 A1* | 2/2023 | Liu | ............... | G06T 7/70 |
| 2023/0145728 A1* | 5/2023 | Liu | ............... | G06T 7/70 |
| | | | | 382/156 |
| 2023/0186660 A1* | 6/2023 | Valecha | ............... | G06F 40/40 |
| | | | | 382/206 |
| 2023/0334819 A1* | 10/2023 | Hao | ............... | G06T 7/70 |
| 2023/0351632 A1* | 11/2023 | Chung | ............... | G06T 7/73 |
| 2024/0028129 A1* | 1/2024 | Whitmire | ............... | G06F 3/014 |

FOREIGN PATENT DOCUMENTS

| | | |
|---|---|---|
| CN | 112181551 | 1/2021 |
| CN | 111880648 | 1/2022 |
| TW | 202217516 | 5/2022 |

OTHER PUBLICATIONS

"Office Action of Taiwan Counterpart Application", issued on Apr. 12, 2024, p. 1-p. 10.

* cited by examiner

CONTROL DEVICE AND CONTROL METHOD

TECHNICAL FIELD

The disclosure relates to a control device, and in particular relates to a control device and a control method.

DESCRIPTION OF RELATED ART

In order to bring immersive experience to users, various technologies are constantly being developed, such as augmented reality (AR) and virtual reality (VR). AR technology allows users to bring virtual elements into the real world. VR technology allows users to enter a whole new virtual world and experience a different life. Furthermore, wearable devices are often used to provide these immersive experiences.

SUMMARY

The present invention provides a control device and a control method, enabling users to precisely control objects in a virtual world.

A control device of the present invention is adapted to control an object in a virtual world. The control device includes a display and a controller. The display is configured to display the virtual world. The controller is coupled to the display. The controller is configured to perform the following functions. In the virtual world, a control surface is formed around a user. A first ray is emitted from the object. Based on the first ray, a first control point is formed on the control surface. According to the first control point, a first control is performed on the object.

A control method of the present invention is adapted to control an object in a virtual world. The control method includes the following operation. A control surface is formed around the user. A first ray is emitted from the object. A first control point is formed on the control surface based on the first ray. The object is controlled according to the first control point.

Based on the above, by emitting rays from the object, the user may precisely control the object in the virtual world.

DETAILED DESCRIPTION OF DISCLOSED EMBODIMENTS

In order to make the content of the disclosure easier to understand, the following specific embodiments are illustrated as examples of the actual implementation of the disclosure. In addition, wherever possible, elements/components/steps with the same reference numerals in the drawings and embodiments represent the same or similar parts.

In addition, unless otherwise defined, all terms (including technical and scientific terms) used herein have the same meaning as that commonly understood by one of ordinary skill in the art to which this disclosure belongs. It should be further understood that terms such as those defined in commonly used dictionaries should be construed as having meanings consistent with their meanings in the context of the related art and the disclosure, and are not to be construed as idealized or excessive formal meaning, unless expressly defined as such herein.

The present invention may be understood by referring to the following detailed description in conjunction with the accompanying drawings. It should be noted that, for the ease of understanding by the readers and for the brevity of the accompanying drawings, multiple drawings in the present invention only depict a portion of the electronic device, and the specific elements in the drawings are not drawn according to the actual scale. In addition, the number and size of each of the elements in the figures are for illustration purposes only, and are not intended to limit the scope of the present invention.

It should be noted that, in the following embodiments, the technical features in several different embodiments may be replaced, reorganized, and mixed to complete other embodiments without departing from the spirit of the present invention. Moreover, in the following description and patent claims, words such as "comprising" and "including" are open-ended words, so they should be interpreted as meaning "including but not limited to . . . ".

In order to bring immersive experience to users, various technologies are constantly being developed, such as augmented reality (AR) and virtual reality (VR). AR technology allows users to bring virtual elements into the real world. VR technology allows users to enter a whole new virtual world and experience a different life. Furthermore, wearable devices are often used to provide these immersive experiences.

In the virtual world, to control the object, a ray may be emitted from the control device or the position of the user, such as any part of the body of the user (wrist, finger). In addition, the object pointed by the ray is the object to be controlled. However, this control method must first specify and identify the starting position of the ray and precisely determine the direction the user is pointing, which requires high recognition accuracy, thereby increasing the complexity of designing the control device. Moreover, the user often needs to maintain a specific posture or gesture (e.g., making or opening a fist) in order to perform correct control. That is to say, misjudgment may occur when the user is pointing in an unclear direction or is not maintaining a specific posture or gesture. Furthermore, since the user has to maintain a specific gesture, the hands cannot be placed arbitrarily, which diminishes the user experience. In addition, the process of moving the ray through the control device or gestures is also prone to unclear control devices or gestures, and accidental touches are likely to occur when the ray sweeps over other objects. Therefore, how to precisely control objects in the virtual world simply and effectively while maintaining a comfortable posture for the user has been a subject that those skilled in the art have been pursuing for a long time.

Figure 1A:
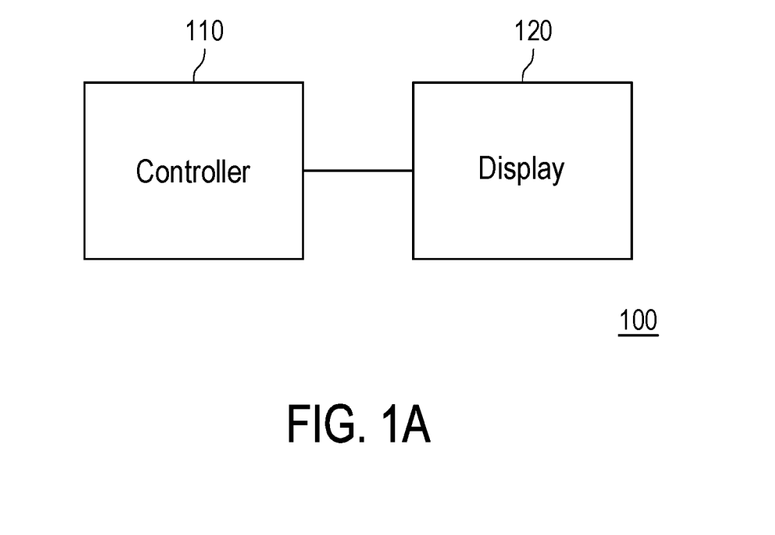
FIG. 1A is a schematic diagram of a control device according to an embodiment of the present invention.

FIG. 1A is a schematic diagram of a control device according to an embodiment of the present invention. Referring to FIG. 1A, a control device 100 is adapted to control an object in a virtual world. Furthermore, the control device 100 includes a display 120 and a controller 110. The display 120 is configured to display the virtual world. The controller 110 is coupled to the display 120.

It should be noted that the controller 110 may perform the following functions. First, in the virtual world displayed on the display 120, a control surface is formed around the user. Next, in the virtual world displayed on the display 120, a first ray is emitted from the object. In an embodiment, the first ray may be emitted from the surface of the object, and the first ray is a straight line or a curve, which is not limited by the present invention. Then, in the virtual world displayed on the display 120, based on the first ray, a first control point is formed on the control surface. In the virtual world displayed on the display 120, a first control is performed on the object according to the first control point. In this way, the user may precisely control the object simply and intuitively through the first control point on the control surface.

In an embodiment, the controller 110 may form the first control point on the control surface based on the intersection point of the first ray emitted from the object and the control surface around the user. However, the disclosure is not limited thereto. In one embodiment, the control device 100 is, for example, a head-mounted display (HMD), wearable glasses (e.g., AR/VR goggles), an electronic device, other similar devices, or a combination of these devices. However, the disclosure is not limited thereto.

In this embodiment, the controller 110 may be, for example, a microcontroller unit (MCU), a central processing unit (CPU), a microprocessor, a digital signal processor (DSP), a programmable controller, a programmable logic device (PLD), or other similar devices, or a combination of these devices, which is not limited in the present invention. Furthermore, in one embodiment, each of the functions of the controller 110 may be implemented as multiple codes. These codes are stored in a memory, and these codes are executed by the controller 110. Alternatively, in one embodiment, each of the functions of the controller 110 may be implemented as one or more circuits. The disclosure does not limit the implementation of each of the functions of the controller 110 by software or hardware.

In one embodiment, the display 120 includes, for example, an organic light-emitting diode (OLED) display device, a mini LED display device, a micro LED display device, a quantum dot (QD) LED display device, a liquid-crystal display (LCD) device, a tiled display device, a foldable display device, or an electronic paper display (EPD). However, the disclosure is not limited thereto.

Figure 1B:
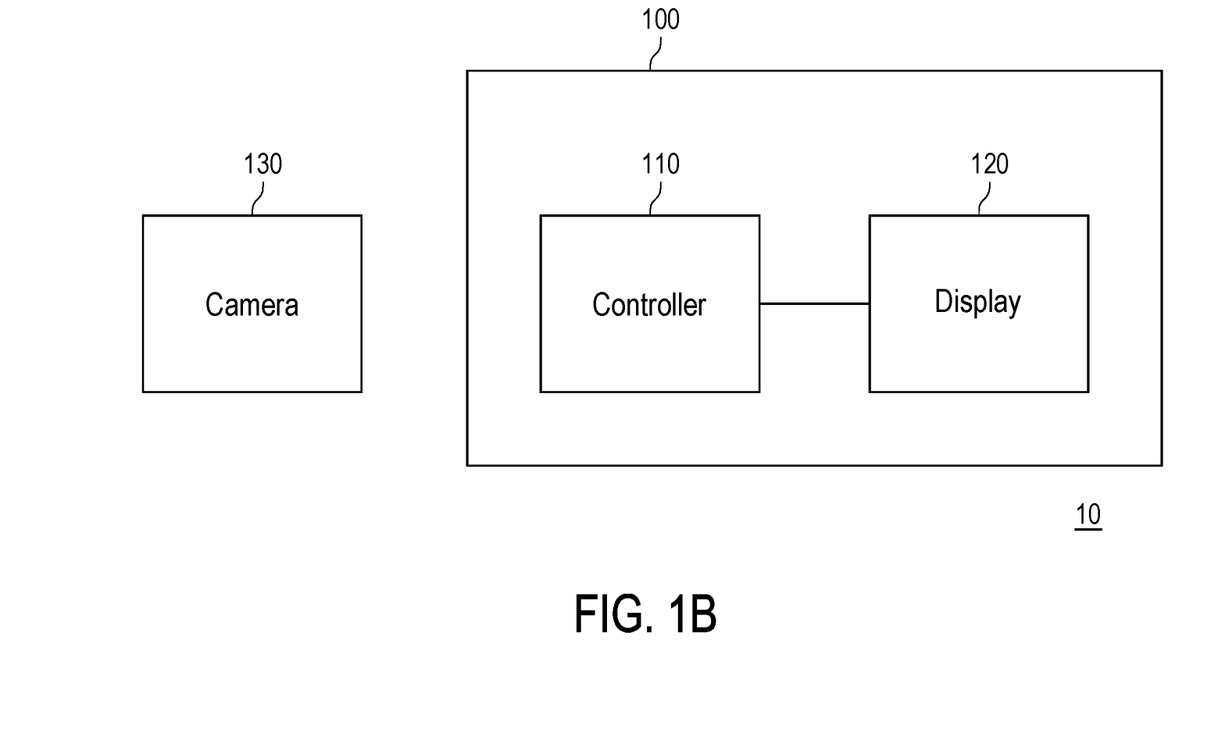
FIG. 1B is a schematic diagram of a control system according to an embodiment of the present invention.

FIG. 1B is a schematic diagram of a control system according to an embodiment of the present invention. The control system 10 includes a control device 100 and a camera 130. Details of the control device 100 may refer to the description of FIG. 1A, and are not repeated herein.

In one embodiment, the camera 130 includes, for example, a complementary metal oxide semiconductor (CMOS) camera or a charge coupled device (CCD) camera, and the auxiliary light unit includes an infrared irradiation unit. However, the disclosure is not limited thereto. In addition, in one embodiment, the camera 130 may be disposed outside the control device 100, so as to form the control system 10 integrally. In another embodiment, the camera 130 may be disposed in the control device 100. That is to say, the disclosure does not limit the location where the camera 130 is disposed.

In one embodiment, the camera 130 may be configured to obtain (photograph) images of the user in the real world. Moreover, the controller 110 may perform image processing based on the obtained image, so as to determine the intention of the user. That is to say, the controller 110 may generate a user command related to the intention of the user according to the image obtained by the camera 130.

In one embodiment, the camera 130 may obtain user images. The user image includes the hand of the user (also referred to as a real hand) or a handheld remote controller in the real world. The controller 110 may receive the aforementioned user image from the camera 130. Moreover, the controller 110 may determine whether the control anchor point corresponding to the virtual hand of the user or the virtual handheld remote controller touches the first control point on the control surface in the virtual world according to the user image. For example, the control anchor of the virtual hand of the user or the virtual handheld remote controller in the virtual world may correspond to the hand of the user or the handheld remote controller in the real world, so as to operate in the virtual world. When the control anchor point in the virtual world touches the first control point, the user may perform various controls on the object through the first control point. In other words, in response to the control anchor point touching the first control point, the controller 110 may perform the first control on the object. It should be noted that, for the convenience of illustration, the virtual hand is used for description below, but the disclosure is not limited to the virtual hands, the virtual handheld remote controllers, or other objects with similar functions for controlling in the virtual world.

In one embodiment, when the virtual hand of the user approaches or touches the first control point, the first control point may be displayed in a highlighted (to be selected) state. In one embodiment, when the virtual hand of the user approaches or touches the first control point, the surrounding image of the object corresponding to the first control point or the first ray emitted by the object may display a prompt mark, such as image color change, brightness increase, outline enhancement, text or animation description display, or changes such as color, highlight etc., of the first ray. In this way, the user may clearly know that the object may be controlled through the first control point.

In an embodiment, the control surface may be, for example, a plane surface, a cubic surface, a cylindrical surface, a spherical surface, or an ellipsoidal surface, but the disclosure is not limited thereto. In an embodiment, the control surface distance between the control surface and the user may be a predetermined distance, for example, 40 cm, but the disclosure is not limited thereto. In one embodiment, the control surface distance may be determined according to the personal parameters of the user. In an embodiment, the personal parameters of the user may include, for example, arm length, forearm length, height, head length, or other and various physical data of the user, and the disclosure is not limited thereto. Since the proportion of the human body follow certain rules, the most suitable control surface distance for the user may be calculated based on any combination of one or more physical data. In one embodiment, the center (e.g., center of gravity, center of circle, or center of sphere) or focal point of the cubic surface, cylindrical surface, spherical surface, or ellipsoidal surface may overlap the user. For example, the control surface is a spherical surface. Moreover, the center of the spherical surface overlaps with the center point of the user, and the radius of the spherical surface is less than or equal to the arm length or forearm length of the user. Alternatively, the control surface may be two spherical surfaces. In addition, the centers of the two spherical surfaces are respectively located at the center point of the left shoulder and the center point of the right shoulder of the user, and the radii of the two spherical surfaces are less than or equal to the arm length or forearm length of the user. That is, the control surface may be formed around the user so that the user may easily touch the control surface. In addition, the user may choose a suitable control surface shape according to his own posture or application scenario. Furthermore, the user may also adjust the position and range (size) of the control surface according to the actual usage scenario, and its implementation is described in detail in the subsequent embodiments.

In one embodiment, a sensor is disposed in the control device 100, and the sensor may detect the position where the user wears the control device 100, so as to automatically obtain the personal parameters of the user. In another embodiment, the camera 130 may capture a posture image including the posture of the user, and the controller 110 may automatically calculate the personal parameters of the user based on the posture image. In yet another embodiment, the user may manually input the personal parameters of the user to the control device 100. In other words, the disclosure does not limit the manner of obtaining the personal parameters of the user.

It is worth mentioning that the user controls the object through the control point on the adjacent control surface instead of directly controlling the distant object. In this way, the user may easily and precisely control the object, thereby enhancing the user experience.

Figure 2:
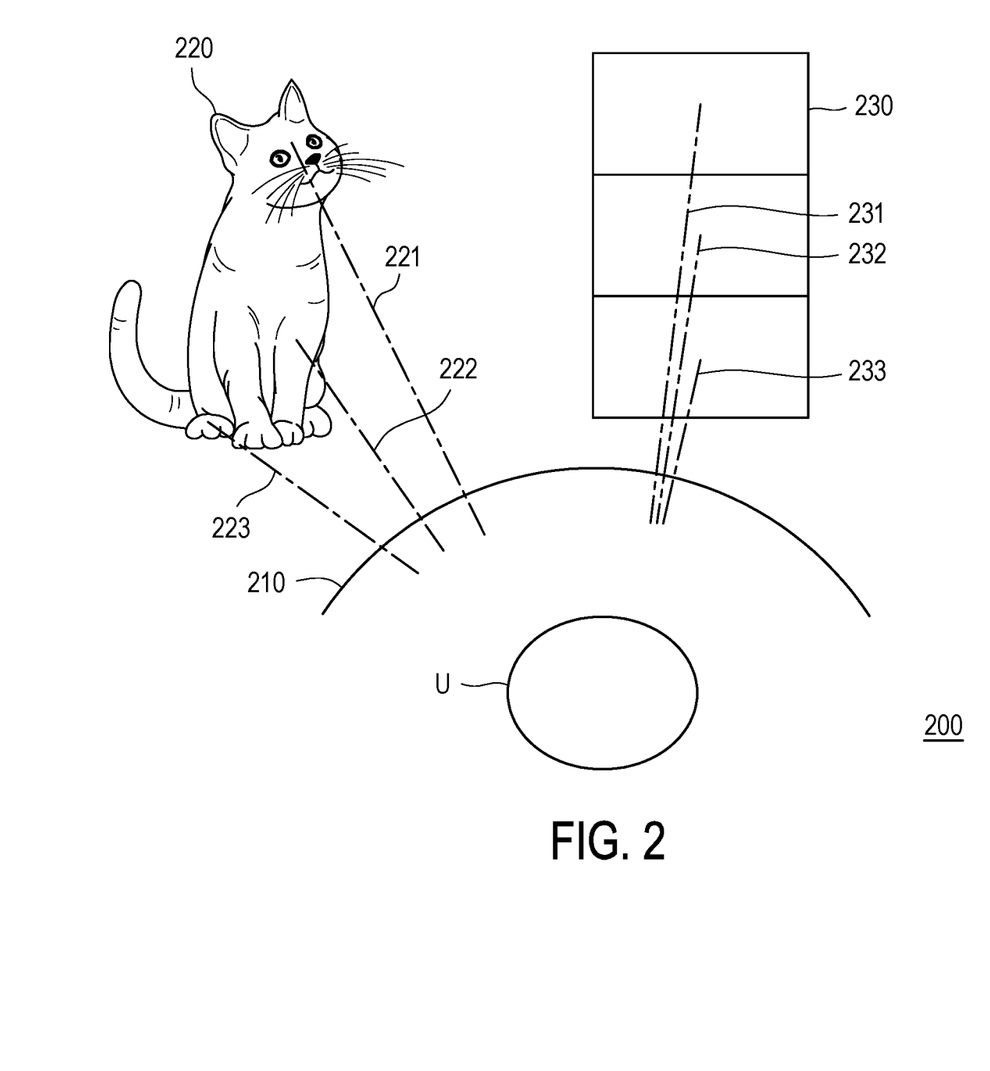
FIG. 2 is a schematic diagram of a usage scenario according to an embodiment of the present invention.

FIG. 2 is a schematic diagram of a usage scenario according to an embodiment of the present invention. Referring to FIG. 1A to FIG. 2, a scenario 200 includes a user U, an object 220 (also referred to as a cat) and an object 230 (also referred to as a button region) in the virtual world. The object 220 and the object 230 may each include multiple control regions. Moreover, the object 220 and each control region of the object 230 may respectively emit rays 221, 222, 223, 231, 232, and 233 toward the direction of the user U. In addition, a control surface 210 is formed around the user U.

In one embodiment, the control surface 210 is a virtual surface, and/or any one of the rays 221, 222, 223, 231, 232, and 233 are virtual rays. That is to say, the user U may not normally see the existence of the control surface 210 and the rays 221, 222, 223, 231, 232, and 233. The control surface 210 or the rays 221, 222, 223, 231, 232, and 233 emerges only when the hand of the user U approaches or touches the hidden control surface 210 or the control point. Moreover, when the hand of the user U moves away from the control surface 210 or the control point, the control surface 210 or the rays 221, 222, 223, 231, 232, and 233 may enter the hidden state again. In other words, the controller 110 may determine whether to display or hide the control surface 210 or the rays 221, 222, 223, 231, 232, and 233 according to the hand distance between the virtual hand of the user U and the control surface 210 or the hand distance between the virtual hand of the user U and the control point in the virtual world. In this way, the control surface 210 or the rays 221, 222, 223, 231, 232, and 233 emerges only when the user U needs to control the object, so as not to affect the visual perception of the user U. In one embodiment, the display control surface 210 and the rays 221, 222, 223, 231, 232, and 233 may be replaced by the image effect of the object itself. In other words, the disclosure does not limit the actual presentation manner of the control surface 210 and the rays 221, 222, 223, 231, 232, and 233, and FIG. 2 is only an implementation manner for convenience of description.

It is worth mentioning that when the control surface 210 and the rays 221, 222, 223, 231, 232, and 233 are in the hidden state, the virtual hands of the user U may be placed arbitrarily. That is to say, since the control surface 210 and the rays 221, 222, 223, 231, 232, and 233 are in the hidden state at this time, the virtual hands of the user U does not trigger the control of the control point on the control surface 210. In this way, when there is no need to control, the virtual hands of the user U may be comfortably placed without restriction, thereby enhancing the user experience.

In one embodiment, the object 220 (the cat) may include multiple control regions. For example, the head of the object 220 is the first control region, the body of the object 220 is the second control region, and the feet of the object 220 are the third control region. The first control region may emit the ray 221 (also referred to as the first ray), the second control region may emit the ray 222 (also referred to as the second ray), and the third control region may emit the ray 223 (also referred to as the third ray). In one embodiment, the starting points of the rays 221, 222, and 223 may be respectively located at the center points of the first control region, the second control region, and the third control region, but the disclosure is not limited thereto. Moreover, the rays 221, 222, and 223 may respectively intersect with the control surface 210 to form a first control point, a second control point, and a third control point.

It should be noted that, in some embodiments, the user U may click on the first control point, so that the object 220 has the effect of being caressed on the head. Moreover, the user U may click on the second control point, so that the object 220 has the effect of being tickled. Furthermore, the user U may click on the third control point, so that the object 220 moves or rotates. When the object 220 moves or rotates, the control points corresponding to the object 220 also move correspondingly on the control surface 210. That is to say, the controller 110 may control the object 220 differently according to different control points corresponding to the object 220. Moreover, the controller 110 may move the position of the control point corresponding to the object 220 on the control surface 210 according to the movement or rotation of the object 220. In this way, the user U may perform various controls on the object 220 according to the multiple control points corresponding to the object 220.

In one embodiment, the object 230 (the button region) may include multiple control regions. For example, the object 230 may include a first button, a second button, and a third button from top to bottom. The first button may emit the ray 231 (also referred to as the first ray), the second button may emit the ray 232 (also referred to as the second ray), and the third button may emit the ray 233 (also referred to as the third ray). The rays 231, 232, and 233 may respectively intersect with the control surface 210 to form a first control point, a second control point, and a third control point.

It should be noted that, in some embodiments, the first control point, the second control point, and the third control point corresponding to the object 230 may form a control group, so that the first control point, the second control point, and the third control point are adjusted synchronously (e.g., adjusting the display mode, the control point distance between the control points, or the control point position of individual control points), so as to facilitate the user to select and control.

For example, control points in a control group may be displayed or hidden synchronously. For example, when a control group is displayed and the virtual hand of the user approaches, touches, or selects the control group, the controller 110 may fade the content on the control surface 210 other than the control group. That is to say, when a control group is selected, the control surface 210 may display only one or more selected control groups, so as to facilitate the user U to focus on the content of the control group.

For another example, the magnification of the control group may be synchronously set (equivalent to setting the control point distance). For example, when a control group is selected, the controller 110 may synchronously magnify the control point distance in the control group, so that the distribution of the control points is more dispersed than before. For example, the control point distance may be at least 5 cm, but the disclosure is not limited to thereto. It should be noted that the manner of adjusting the control point distance of the control points is described in detail in subsequent embodiments.

For another example, the offset position of the control point (the control point position) of the control group may be synchronously set. For example, when a control group is selected, the controller 110 may synchronously move the control points in the control group to a relatively spacious or fixed region on the control surface 210. In this way, by adjusting the control point positions of the control points in the control group, it facilitates the user U to precisely control the control points.

For another example, the control points in the control group may be displayed on the control surface 210 in the form of a keyboard, so as to facilitate the user to touch each key on the keyboard to control each button on the object 230. In this way, the user U may intuitively input various commands (control commands) to the object 230, thereby increasing the convenience of control in the virtual world and increasing the input speed of the user.

Figure 3A:
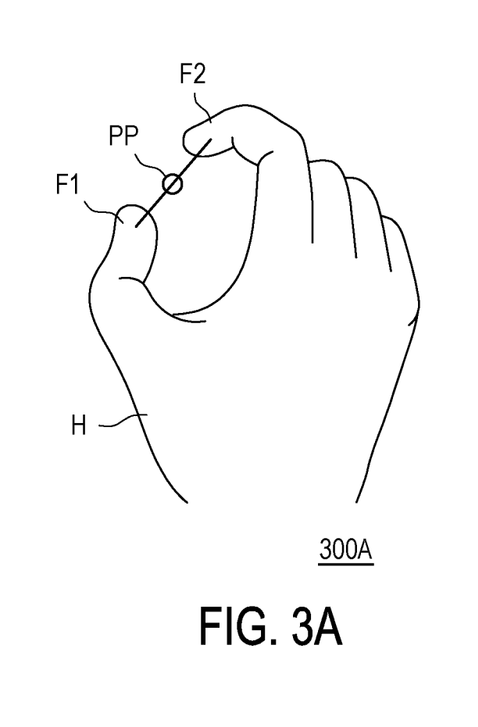
FIG. 3A is a schematic diagram of a control gesture according to an embodiment of the present invention.
Figure 3B:
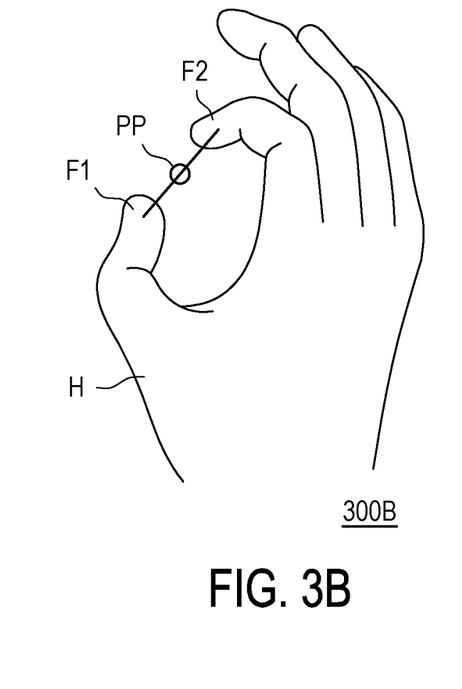
FIG. 3B is a schematic diagram of a control gesture according to an embodiment of the present invention.
Figure 3C:
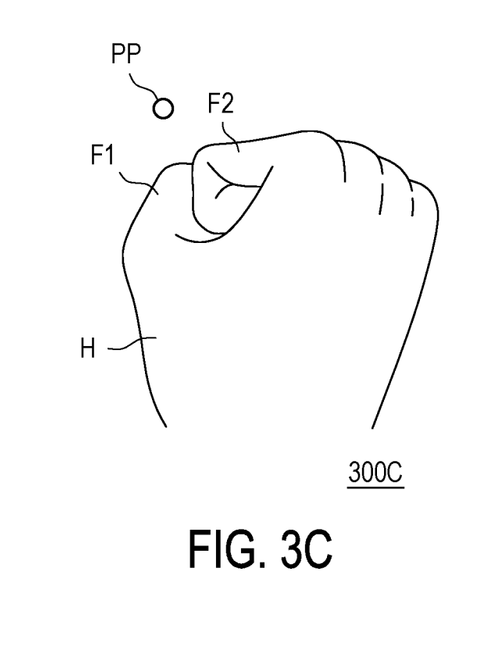
FIG. 3C is a schematic diagram of a control gesture according to an embodiment of the invention.

FIG. 3A is a schematic diagram of a control gesture according to an embodiment of the present invention. FIG. 3B is a schematic diagram of a control gesture according to an embodiment of the present invention. FIG. 3C is a schematic diagram of a control gesture according to an embodiment of the invention. Referring to FIG. 1A to FIG. 3C, a gesture 300A, a gesture 300B, and a gesture 300C respectively show various postures of the virtual hand H of the user U in the virtual world when controlling.

In one embodiment, the camera 130 may be used to capture images of the real hand gestures of the user U in the real world, and the controller 110 may perform image processing based on the images captured by the camera 130. Then, the controller 110 may transmit a signal to the display 120, so that the virtual hand H of the user U in the virtual world generates a movement corresponding to the real hand in the real world. However, the disclosure is not limited thereto.

The gesture 300A, the gesture 300B, and the gesture 300C each include a finger F1 (also referred to as the first finger or thumb), a finger F2 (also referred to as the second finger or index finger), and a pinch point PP. In an embodiment, the pinch point PP may be disposed at a position closer to the finger F1 on the line connecting the finger F1 to the finger F2. Generally speaking, when the virtual hand H of the user U is pinching, the movement amount of the finger F1 is smaller than the movement amount of the finger F2. In this way, the user U may easily complete the pinching of the pinch point PP.

In an embodiment, the user U may select or confirm the object 220 or the object 230 in the virtual world by pinching the pinch point PP. For example, when the pinch point PP overlaps or is the only control point closest to the corresponding object 220, the user U may pinch the pinch point PP to select or confirm the object 220. In one embodiment, the user U may pinch the pinch point PP for a predetermined time period or pinch the pinch point PP and then release it, so that the sub-window function appears, or to perform confirmation. In other words, the user U may pinch the pinch point PP to trigger the corresponding control point of the object 220 to control the object 220.

It is worth mentioning that when the user U pinches the pinch point PP, the fingers other than the finger F1 and the finger F2 may maintain any posture. That is to say, the user U may arbitrarily choose a comfortable posture (as shown in FIG. 3A or FIG. 3B or other gestures) and perform a pinching action. Moreover, in one embodiment, as shown in FIG. 3C, after the finger F1 and the finger F2 of the user U touch the pinch point PP, the finger F1 and the finger F2 may continue to be closed toward the palm of the hand and maintain the posture of a fist. In addition, the user U may maintain the selected state of the pinch point PP by maintaining the posture of a fist. However, the disclosure is not limited thereto. For example, the user may select, trigger, or deselect the control point corresponding to the object 220 through other gestures, such as sliding the hand in any one direction of up, down, left, right, front, and back. In this way, the user U may control the virtual world in the most comfortable posture without being limited by gestures, thereby enhancing the user experience.

Figure 4:
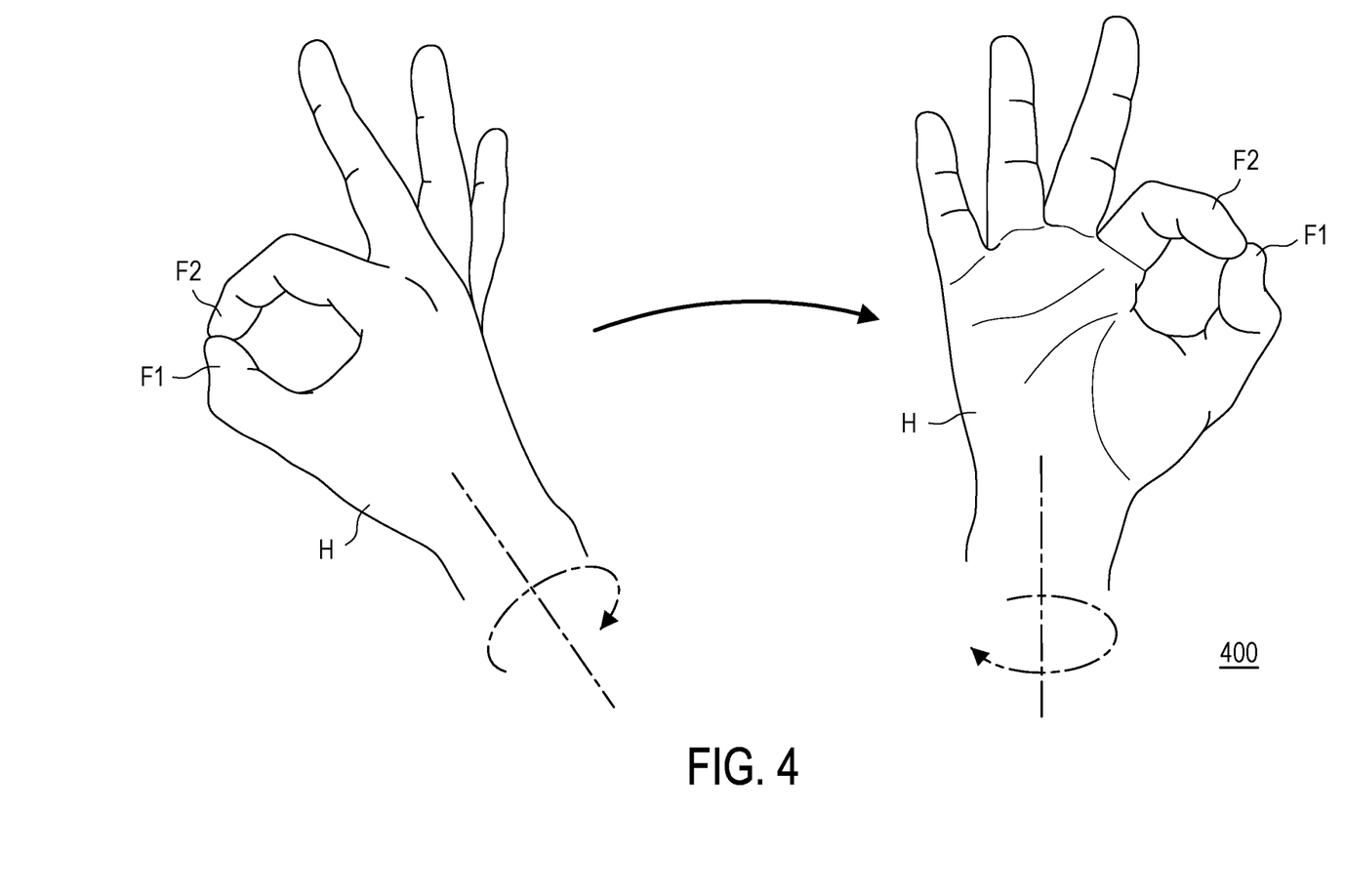
FIG. 4 is a schematic diagram of a control scenario according to an embodiment of the present invention.

FIG. 4 is a schematic diagram of a control scenario according to an embodiment of the present invention. Referring to FIG. 1A to FIG. 4, a scenario 400 shows the virtual hand H of the user U pinching and then dragging in the virtual world. In one embodiment, after the user U pinches, the finger F1 and the finger F2 of the virtual hand H may maintain the pinching state to drag the controlled object (such as the object 220).

It should be noted that, as shown in FIG. 4, when the user U is dragging, the wrist of the virtual hand H may be turned arbitrarily. That is, the wrist of the virtual hand H does not need to be maintained at a specific angle. If the wrist is maintained at a specific angle for dragging, the posture of the user U is restricted. In other words, by determining only the relative relationship (such as the distance) between the finger F1 and the finger F2 to maintain the pinching state, the user U may perform the control more flexibly. In this way, the user U may perform various controls in an ergonomic condition, thereby enhancing the user experience.

Figure 5A:
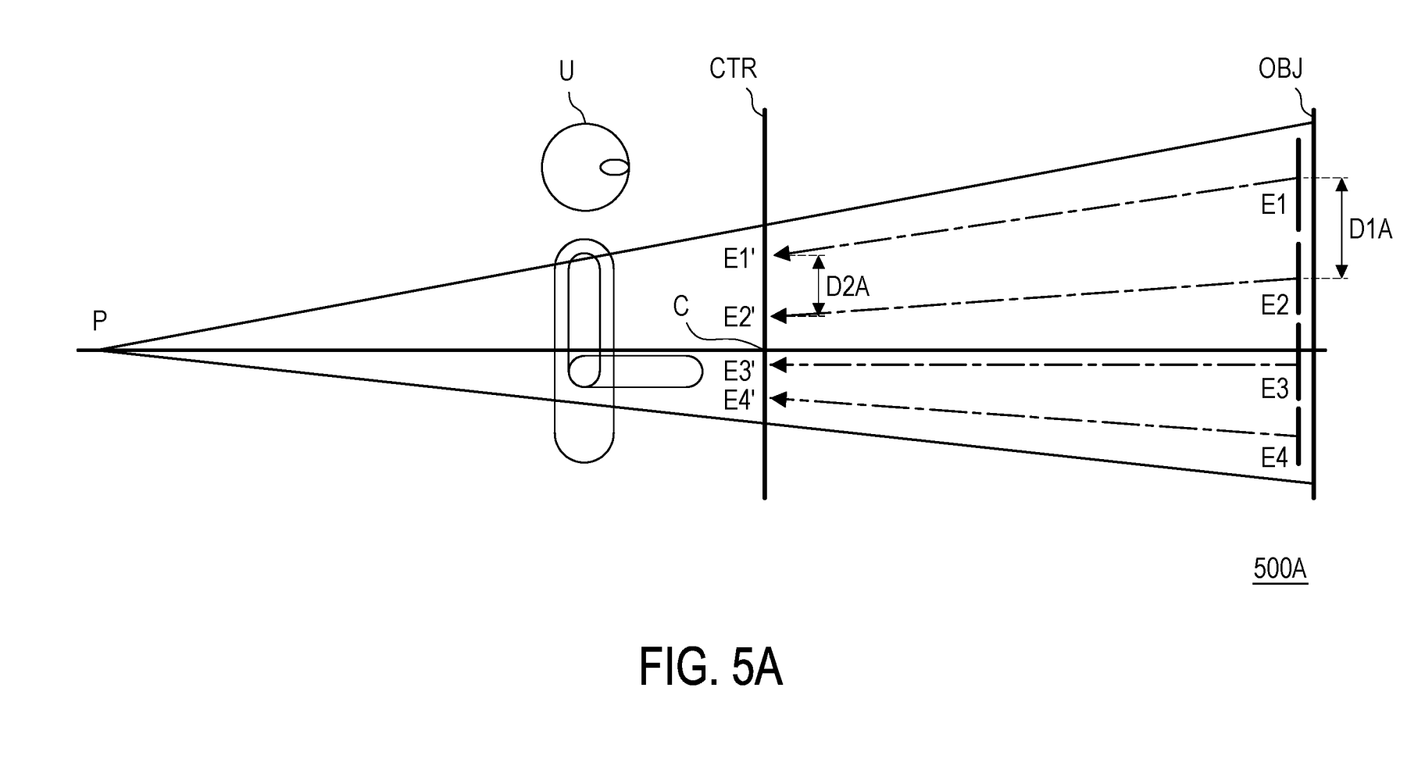
FIG. 5A is a schematic diagram of a control scenario according to an embodiment of the present invention.

FIG. 5A is a schematic diagram of a control scenario according to an embodiment of the present invention. Referring to FIG. 1A to FIG. 5A, a scenario 500A schematically shows the relationship among the user U, the control surface CTR, and the object OBJ. As shown in FIG. 5A, the object OBJ may include a control region E1 (also referred to as the first control region), a control region E2 (also referred to as the second control region), a control region E3 (also referred to as the third control region), and a control region E4 (also referred to as the fourth control region). The control regions E1 to E4 may be located on the surface of the object OBJ, but the disclosure is not limited thereto. Multiple rays (e.g., the first ray to the fourth ray) may be respectively emitted from the control regions E1 to E4 in a direction facing the user U. In an embodiment, the starting points of the rays may be respectively located at the center points of the control regions E1 to E4, but the disclosure is not limited thereto. In addition, the multiple rays corresponding to the control regions E1 to E4 may respectively intersect the control surface CTR, thereby forming the control region E1' (also referred to as the first control point), the control region E2' (also referred to as the second control point), the control region E3' (also referred to as the third control point), and the control region E4' (also referred to as the fourth control point).

Furthermore, the distance between the control regions E1 to E4 may be referred to as the control region distance, and the distance between the control points E1' to E4' may be referred to as the control point distance. For example, the distance between the control region E1 and the control region E2 may be marked as the control region distance D1A, and the distance between the control point E1' and the control point E2' may be marked as the control point distance D2A.

In addition, the rays corresponding to the control regions E1 to E4 may all intersect at the projection point P. For example, the ray emitted by the control region E1 (also referred to as the first ray) and the ray emitted by the control region E2 (also referred to as the second ray) both intersect at the projection point P. That is to say, the starting points of the rays corresponding to the control regions E1 to E4 are respectively the centers of the control regions E1 to E4, and the ending point of the rays corresponding to the control regions E1 to E4 is the projection point P.

It is worth mentioning that the control points E1' to E4' are formed based on the intersection of the corresponding rays on the control surface, and the rays corresponding to the control points E1' to E4' are formed based on the centers of the control regions E1 to E4 as the starting points and the projection point P as the end point. In other words, when the position of the project point P changes, the control point distance between the control points E1' to E4' (e.g., the control point distance D2A) also changes accordingly.

For example, when the projection point P is located behind the user and moves towards the back of the user (e.g., to the left side of FIG. 5A) (i.e., the distance from the user U is farther than the original projection point P), the control points E1' to E4' move towards each other. In other words, the control point distance (e.g., the control point distance D2A) between the control points E1' to E4' decreases. Conversely, when the projection point P is located behind the user and moves towards the front of the user (e.g., to the right side of FIG. 5A) (i.e., the distance from the user U is closer than the original projection point P), the control points E1' to E4' move away from each other. In other words, the control point distance (e.g., the control point distance D2A) between the control points E1' to E4' increases. Therefore, in one embodiment, the user U may adjust the control point distance (i.e., the displayed magnification) between the control points E1' to E4' displayed on the control surface CTR by adjusting the position of the projection point P (i.e., the projection point distance between the user U and the projection point P). That is to say, the controller 110 may determine the control point distance D2A between the control point E1' and the control point E2' based on the projection point P and the position of the user U.

In addition, since the control surface CTR adjacent to the user U is located between the projection point P and the object OBJ, the control point distance between the control points E1' to E4' (e.g., the control point distance D2A) is smaller than the control region distance between control regions E1 to E4 (e.g., the control region distance D1A). That is to say, in response to the user U being located between the projection point P and the object OBJ, the controller 110 may set the control point distance D2A between the first control point and the second control point to be smaller than the control region distance D1A between the control region E1 and the second control region E2.

Incidentally, the position and range (size) of the control surface CTR may be further adjusted. For example, the control surface CTR in FIG. 5A may include an origin C and a limited range, and rays and corresponding control points outside the limited range are neither displayed nor controlled. In an embodiment, the origin C may be set at the center of the control surface CTR, but the disclosure is not limited thereto. In one embodiment, when the user U is to adjust the position of the control surface CTR, the origin C of the control surface CTR may be dragged with one hand (or both hands) of the virtual hand H. For example, the user U may pull the control surface CTR closer to or away from the user U. For example, when both hands of the user U are extended forward at the same time, the position of the control surface CTR (including the origin C) may be moved towards the front of the user U (i.e., the distance from the user U is farther than the original control surface CTR). That is to say, in response to the position of the origin C, the controller 110 may set the control surface distance between the control surface CTR and the user U.

For another example, the user U may move the control surface CTR to any direction with a constant distance from the user U (e.g., up, down, left, and right of the user U). For example, when both hands of the user U move to the left at the same time, the position of the control surface CTR (including the origin C) may be moved to the left of the user U. For another example, when both hands move in different directions, the control surface CTR may be moved toward the midpoint of both hands. For example, when the left hand of the user U moves to the left of the user U and the right hand moves to the top of the user U, the control surface CTR may be moved to the top left. In this way, the user U may move the position of the control surface CTR by dragging the position of the origin C of the control surface CTR according to the actual usage scenario, thereby adjusting the control point range covered by the control surface CTR.

Furthermore, in one embodiment, when the user U is to adjust the size of the range of the control surface CTR, the limited range of the control surface CTR may be scaled with one hand (or both hands) of the virtual hand H. For example, the user U may zoom in or zoom out the range of the control surface CTR. For example, when both hands of the user U move away from each other, the limited range of the control surface CTR may be expanded to include more control points (e.g., other control points other than the control points E1' to E4' in FIG. 5A are included). That is to say, in response to the user U expanding the limited range CTR of the control surface, the ineffective control points originally located outside the limited range may be moved into the limited range, thereby setting the ineffective control points as effective control points.

For another example, when both hands of the user U move towards each other, the limited range of the control surface CTR may be reduced to include fewer control points (e.g., reduced to include only the control points E2' and E3'). That is to say, in response to the user U reducing the limited range of the control surface CTR, the effective control points originally located within the limited range may be moved out of the limited range, thereby setting the effective control points as ineffective control points. In this way, the user U may adjust the position and range of the control surface CTR according to the actual usage scenario, so as to select the control points on the control surface CTR more precisely and quickly.

Figure 5B:
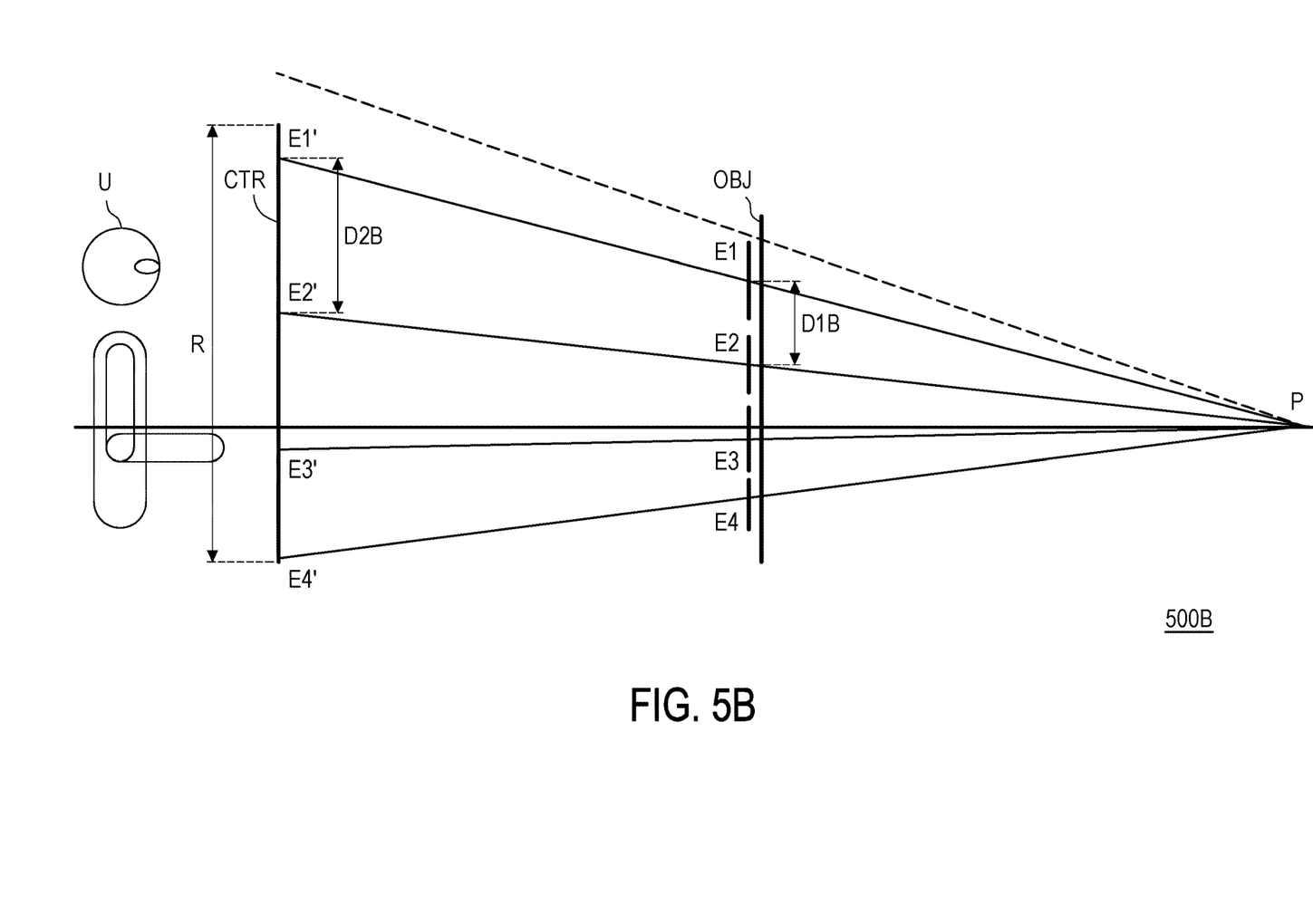
FIG. 5B is a schematic diagram of a control scenario according to an embodiment of the present invention.

FIG. 5B is a schematic diagram of a control scenario according to an embodiment of the present invention. Referring to FIG. 1A to FIG. 5B, a scenario 500B schematically shows the relationship among the user U, the control surface CTR, and the object OBJ. Compared with FIG. 5A where the user U is set between the projection point P and the object OBJ, in FIG. 5B, the object OBJ is set between the user U and the projection point P. The distance between the control region E1 and the control region E2 may be marked as the control region distance D1B, and the distance between the control point E1' and the control point E2' may be marked as the control point distance D2B. In addition, the limited range R is shown in FIG. 5B, which is described in subsequent embodiments. For details about the user U, the control surface CTR, and the object OBJ, reference is made to the description of FIG. 5A, and are not repeated herein.

Similar to FIG. 5A, when the position of the project point P in FIG. 5B changes, the control point distance between the control points E1' to E4' (e.g., the control point distance D2B) also changes accordingly. For example, when the projection point P is located in front of the user and moves towards the front of the user (e.g., to the right side of FIG. 5B) (i.e., the distance from the user U is farther than the original projection point P), the control points E1' to E4' move towards each other. In other words, the control point distance (e.g., the control point distance D2B) between the control points E1' to E4' decreases. Conversely, when the projection point P is located in front of the user and moves towards the back of the user (e.g., to the left side of FIG. 5B) (i.e., the distance from the user U is closer than the original projection point P), the control points E1' to E4' move away from each other. In other words, the control point distance (e.g., the control point distance D2B) between the control points E1' to E4' increases. Therefore, in one embodiment, the user U may adjust the control point distance (i.e., the displayed magnification) between the control points E1' to E4' displayed on the control surface CTR by adjusting the position of the projection point P (i.e., the projection point distance between the user U and the projection point P). That is to say, the controller 110 may determine the control point distance D2B between the control point E1' and the control point E2' based on the projection point P and the position of the user U.

In addition, since the object OBJ is located between the projection point P and the control surface CTR adjacent to the user U, the control point distance between the control points E1' to E4' (e.g., the control point distance D2B) is greater than the control region distance between control regions E1 to E4 (e.g., the control region distance D1B). That is to say, in response to the object OBJ being located between the projection point P and the user U, the controller 110 may set the control point distance D2B between the first control point and the second control point to be greater than the control region distance D1B between the control region E1 and the second control region E2.

In addition, in an embodiment, the projection point P may be set between the user U (the control surface CTR) and the object OBJ, so as to obtain control points corresponding to the control regions on the object OBJ that are oppositely distributed up, down, left, and right. Alternatively, in an embodiment, the projection point P may be set at infinity in front or behind the user U, so as to obtain control points corresponding to the control regions on the object OBJ with the same distribution, that is, the control point distance between each control point is the same as the distance between the corresponding control regions on the object OBJ. In this way, by adjusting the position of the projection point P and the projection point distance between the user U and the projection point P, the user U may adjust the display magnification of the control surface CTR or any control group on the control surface CTR, to adjust the control point distance on the control surface CTR (e.g., the control point distance D2A of FIG. 5A or the control point distance D2B of FIG. 5B), thereby obtaining a better visual experience, and at the same time, objects may be precisely controlled simply and effectively in the virtual world. In addition, by adjusting the position or range of the control surface CTR (e.g., by adjusting the origin C of the control surface CTR), the user U may adjust the control surface distance between the user U and the control surface CTR and the control point range covered by the control surface CTR (the limited range R), therefore, the control surface CTR may be controlled in a comfortable posture, thereby enhancing a better user experience.

It should be noted that, for the convenience of illustration, the control surface CTR in FIG. 5B is shown as a finite length (a finite plane). However, in some embodiments, the control surface CTR is an infinitely extending plane. In addition, FIG. 5B shows a limited range R to indicate an effective control region or an effective display region of the control surface CTR. In an embodiment, the limited range R is the coverage range of the effective control points on the control surface CTR. For example, the control points within the limited range R are effective control points, and the control points outside the limited range R are ineffective control points. That is, in response to the virtual hand of the user U touching an effective control point within the control range R in the virtual world, the controller 110 may accept a control command from the user U. In addition, in response to the virtual hand of the user U touching an ineffective control point outside the control range R in the virtual world, the control command of the user U is not accepted.

For example, FIG. 5B shows a dashed line (ray) starting from the projection point P and passing through the object OBJ, and intersecting outside the limited range R of the control surface CTR, thereby forming an ineffective control point. Since the ineffective control point is outside the limited range R of the control surface CTR, the controller 110 does not execute the operation of the user U on the ineffective control point. In this way, by setting the limited region R, the occurrence of misoperation may be avoided, thereby enhancing the user experience.

Figure 6:
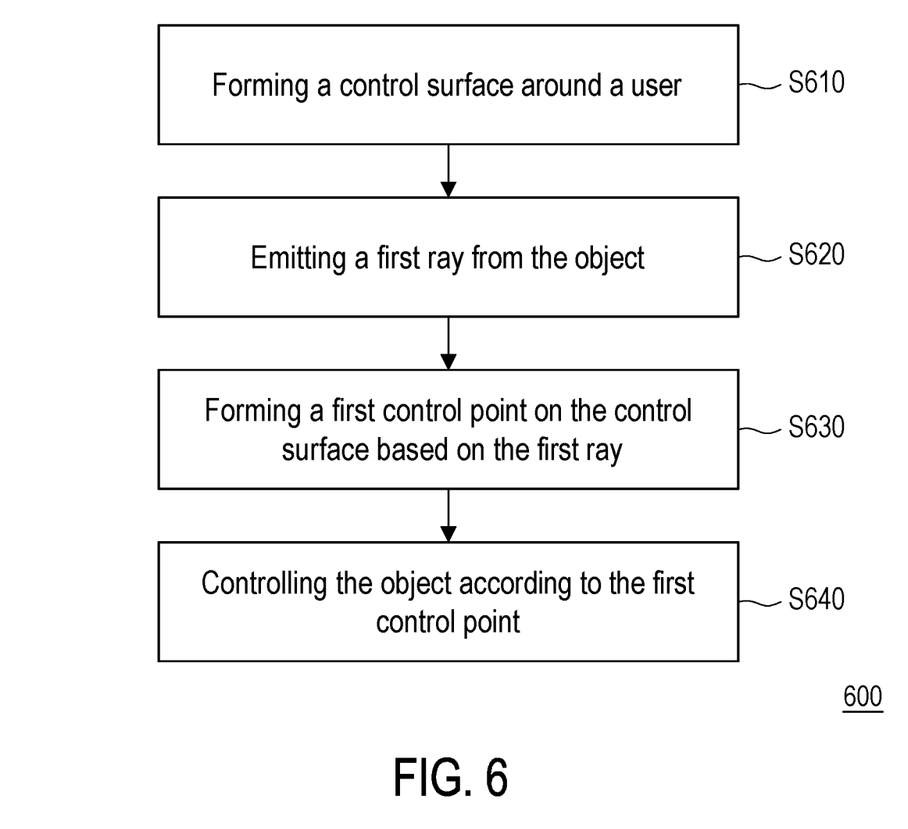
FIG. 6 is a flowchart of a control method according to an embodiment of the present invention.

FIG. 6 is a flowchart of a control method according to an embodiment of the present invention. Referring to FIG. 1 and FIG. 6, the control method 600 schematically shows the operation procedure of the control device 100, but the disclosure is not limited thereto. In this embodiment, the control method 600 includes step S610 to step S640.

In step S610, the controller 110 may transmit a signal to the display 120, so that the control surface 210 is formed around the user U in the virtual world displayed on the display 120. In step S620, the controller 110 may transmit a signal to the display 120, so that an object (e.g., the object 220 or the object 230) in the virtual world displayed on the display 120 emits a first ray (e.g., one of the rays 221 to 233). In step S630, the controller 110 may transmit a signal to the display 120, so that the display 120 may form (display) a first control point on the control surface 210 based on the first ray. In step S640, the controller 110 may transmit a signal to the display 120, so that the user U may control the object (e.g., the object 220 or the object 230) according to the first control point. It should be noted that for relevant implementation details, reference may be made to the descriptions of FIG. 1 to FIG. 5B, and are not repeated herein. In this way, the user U may precisely control the object simply and intuitively through the first control point on the control surface 210.

To sum up, the control device of the present invention adopts a control surface to control objects in the virtual world through a control method. Therefore, the user may precisely control objects in the virtual world simply and effectively while maintaining a comfortable posture.

What is claimed is:

1. A control device, adapted to control an object in a virtual world, wherein the control device comprises:
    a display, configured to display the virtual world; and
    a controller, coupled to the display, wherein the controller is configured to:
        form a control surface around a user in the virtual world as a graphical user interface;
        emit a first ray from the object;
        in response to an intersection of the first ray and the control surface, form a first control point on the control surface based on the first ray; and
        perform a first control on the object according to the first control point.

2. The control device according to claim 1, wherein the controller is further configured to:
    receive a user image, wherein the user image comprises a hand of the user or a handheld remote controller in a real world;
    determine whether a control anchor point corresponding to the hand of the user or the handheld remote controller touches the first control point in the virtual world according to the user image; and
    in response to the control anchor touching the first control point, perform the first control on the object.

3. The control device according to claim 1, wherein the controller is further configured to:
    determine a control surface distance between the control surface and the user according to personal parameters of the user.

4. The control device according to claim 1, wherein the controller is further configured to:
    determine whether to display or hide the control surface or the first ray according to a hand distance between a virtual hand of the user and the control surface or the first control point in the virtual world.

5. The control device according to claim 1, wherein the control surface comprises a plane surface, a cubic surface, a cylindrical surface, a spherical surface, or an ellipsoidal surface.

6. The control device according to claim 1, wherein the object comprises a first control region and a second control region, and the controller is further configured to:
    emit the first ray from the first control region;
    emit a second ray from the second control region, wherein the first ray and the second ray intersect at a projection point;
    form a second control point on the control surface based on the second ray; and
    determine a control point distance between the first control point and the second control point based on positions of the projection point and the user.

7. The control device according to claim 6, wherein the controller is further configured to:
    in response to the user being located between the projection point and the object, set the control point distance between the first control point and the second control point to be smaller than a control region distance between the first control region and the second control region; or
    in response to the object being located between the projection point and the user, set the control point distance between the first control point and the second control point to be greater than the control region distance between the first control region and the second control region.

8. The control device according to claim 1, wherein the object comprises a first control region and a second control region, and the controller is further configured to:
    emit the first ray from the first control region;
    emit a second ray from the second control region;
    form a second control point on the control surface based on the second ray; and
    form a control group with the first control point and the second control point to synchronously adjust the first control point and the second control point.

9. The control device according to claim 8, wherein the controller is further configured to:
    in response to the control group being selected, fade content on the control surface other than the control group.

10. The control device according to claim 1, wherein the control surface comprises a limited range, the controller is further configured to:
    in response to a virtual hand of the user touching an effective control point within the limited range in the virtual world, accept a control command from the user; and
    in response to a virtual hand of the user touching an ineffective control point outside the limited range in the virtual world, not accept the control command from the user.

11. The control device according to claim 10, wherein the controller is further configured to:
    in response to the user expanding the limited range and the ineffective control point being moved within the limited range, set the ineffective control point as the effective control point; and
    in response to the user reducing the limited range and the effective control point being moved outside the limited range, set the effective control point as the ineffective control point.

12. A control method, adapted to control an object in a virtual world, wherein the control method comprises:
    forming a control surface around a user;
    emitting a first ray from the object;
    in response to an intersection of the first ray and the control surface, forming a first control point on the control surface based on the first ray; and
    controlling the object according to the first control point.

13. The control method according to claim 12, further comprising:
    receiving a user image, wherein the user image comprises a hand of the user or a handheld remote controller in a real world;
    determining whether a control anchor point corresponding to the hand of the user or the handheld remote controller touches the first control point in the virtual world according to the user image; and
    in response to the control anchor touching the first control point, performing the first control on the object.

14. The control method according to claim 12, further comprising:

determining a control surface distance between the control surface and the user according to personal parameters of the user.

15. The control method according to claim 12, wherein the object comprises a first control region and a second control region, and the control method further comprises:
   emitting the first ray from the first control region;
   emitting a second ray from the second control region, wherein the first ray and the second ray intersect at a projection point;
   forming a second control point on the control surface based on the second ray; and
   determining a control point distance between the first control point and the second control point based on positions of the projection point and the user.

16. The control method according to claim 15, further comprising:
   in response to the user being located between the projection point and the object, setting the control point distance between the first control point and the second control point to be smaller than a control region distance between the first control region and the second control region; or
   in response to the object being located between the projection point and the user, setting the control point distance between the first control point and the second control point to be greater than the control region distance between the first control region and the second control region.

17. The control method according to claim 12, wherein the object comprises a first control region and a second control region, and the control method further comprises:
   emitting the first ray from the first control region;
   emitting a second ray from the second control region;
   forming a second control point on the control surface based on the second ray; and
   forming a control group with the first control point and the second control point to synchronously adjust the first control point and the second control point.

18. The control method according to claim 17, further comprising:
   in response to the control group being selected, fading content on the control surface other than the control group.

* * * * *